Nov. 26, 1968    J. A. IANDOLO    3,412,604

WIND TUNNEL BALANCE

Filed April 12, 1966

INVENTOR
Joseph A. Iandolo

BY
ATTORNEY

United States Patent Office 3,412,604
Patented Nov. 26, 1968

3,412,604
WIND TUNNEL BALANCE
Joseph A. Iandolo, Rockville, Md., assignor to the United States of America as represented by the Secretary of the Navy
Filed Apr. 12, 1966, Ser. No. 542,121
4 Claims. (Cl. 73—147)

ABSTRACT OF THE DISCLOSURE

A wind tunnel strain gage balance having a pair of diametrically opposed eccentric columns and a central member, where the eccentric columns are each attached to a conical mandrel portion on one end and a generally cylindrical rearward portion on the other end by thin necked portions at either end which act like pin joints. As the balance is subjected to yaw loads, a secondary bending is induced in the eccentric columns due to the compressive end loads. The eccentric columns then act much like mechanical amplifiers permitting the measurement of small yaw loads without greatly sacrificing balance rigidity.

---

The invention described herein may be manufactured and used by or for the Government of the United States of America for governmental purposes without the payment of any royalties thereon or therefor.

The present invention relates generally to a test balance device and more particularly to a balance device having provision for the internal measurement of magnus forces and moments caused by the wind force acting externally on a spinning aerodynamic model undergoing wind tunnel testing.

When a spinning aerodynamic projectile is launched, small side forces in the yaw plane tend to effect the attitude of the projectile. The deviation is relatively small, on the order of two to five degrees, but the greater the distance the projectile travels the greater is the amplification of this small deviation thereby adversely affecting the trajectory accuracy of the projectile. It has become increasedly important, therefore, to be able to measure the magnitude of these side forces or magnus forces and moments at small angles of attack in order to improve the design of aerodynamic projectiles to achieve greater accuracy in flight. One prior art measuring system employs a mounted strain gage on a rectangular section with the thinner part oriented in the yaw plane to provide sufficient sensitivity in the yaw plane and to the reduce the balance stiffness thereby to allow the strain gage to record the yaw forces. This method gives errors in the data at small angles of attack and is not sensitive enough to record small side forces.

The present invention provides a balance device utilizing an eccentric flexure or column member to measure the magnus side forces. Strain gages ar mounted on the eccentric column and when the balance is subjected to yaw loads, the eccentric column bends due to the compressive end loads and, acting like a mechanical amplifier, permits the measurement of small yaw loads without greatly sacrificing balance rigidity in yaw.

An object of the present invention is to provide a new and improved wind tunnel test balance for internal measurement of side forces acting on an aerodynamic body.

Another object of the invention is the provision of a new and improved wind tunnel strain gage balance which permits the measurement of small yaw loads, magnus forces, without greatly sacrificing balance rigidity in the yaw plane.

A further object of the invention is the provision of a new and improved wind tunnel strain gage balance, having increased balance sensitivity at small angles of attack.

Other objects and many of the attendant advantages of the invention will be readily appreciated as the same becomes better understood by reference to the following detailed description when considered in connection with the accompanying drawings wherein.

Figure 1:
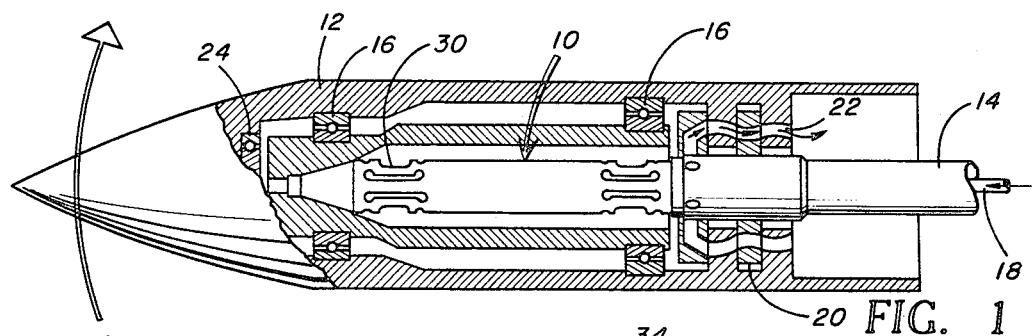
FIG. 1 is a top view of the strain gage balance constructed in accordance with the present invention illustrating a test model attached thereto and the sting for supporting the balance.

Referring now to the drawings wherein like reference characters designate like parts throughout the several views and more particularly to FIG. 1 thereof, the numeral 10 generally indicates the balance device of the present invention supporting a test model 12 and attached to a conventional sting 14. The model is supported on the sting 14 by conventional means such as ball bearings 16 so that it may freely rotate, for example, in a wind tunnel. The sting is provided with a central tube 18 to allow air under pressure to flow into the test model and through a multistage air turbine 20 on the interior surface of the test model to impart the desired spin to the model. The air thereafter is allowed to exhaust rearwardly through air exhaust passages 22. A magnetic tachometer 24 is located in the forward portion of the test model to record the revolutions of the model as it spins because of the air flow.

Figure 3:
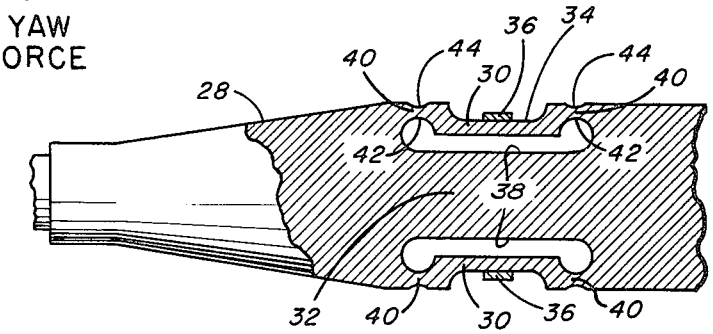
FIG. 3 is a sectional view of a portion of the strain gage balance taken along lines 3—3 of FIG. 2 showing the eccentric column.
Figure 2:
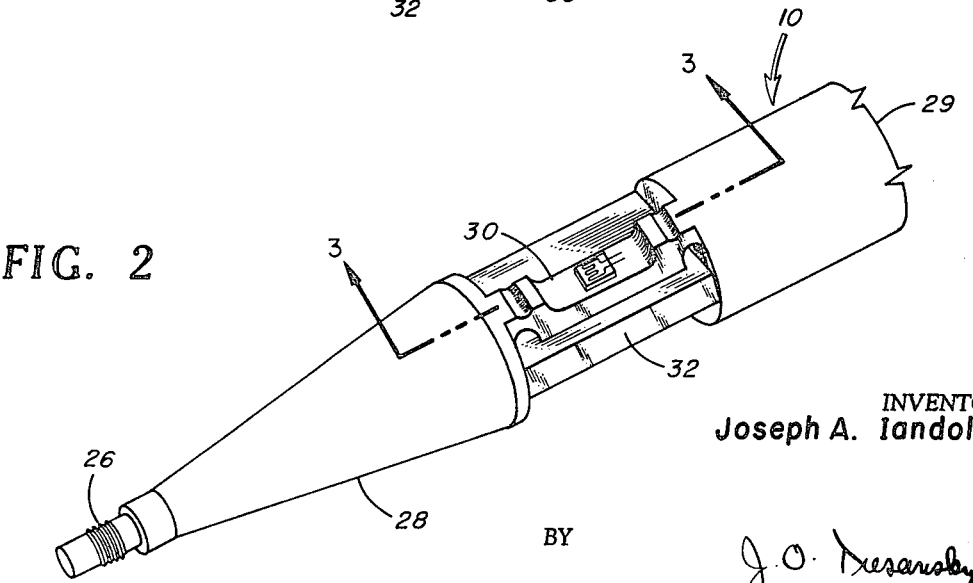
FIG. 2 is a perspective view of a portion of the strain gage balance showing the eccentric column.

Referring now to FIGS. 2 and 3 it is seen that the balance 10 is made from a unitary stock of material and includes a threaded forward extension 26 to facilitate attachment to the test model, a conical mandrel portion 28 to allow for positive positioning of the balance within the test model and a generally cylindrical rearward portion 29. The central portion of the balance device is machined out to form diametrically opposed eccentric columns 30 and central member 32 of more reduced cross-section than the main balance member 10. As more clearly shown in FIG. 3 each of the eccentric columns is formed with an outer flat portion 34 and having an electric resistance wire strain gage 36 mounted thereon. The inner portion 38 of each column is also machined flat. A substantially reduced cross-sectional area portion 40 is formed at each extremity of the eccentric columns. This area can be formed by cutting or drilling the underside of the column along a circular surface 42 and milling the upper side 44 to reduce the thickness of the column support at this point. The resultant column then acts as if it were supported at each end by a pin joint allowing greater freedom of oscillation about the pivot points while retaining rigidity to oscillations in a plane parallel to the pivot plane. The strain gages 36 are connected by conventional means, well known in the art, to appropriate electrical circuits, as for example, a Wheatstone bridge circuit, to indicate the variations in load applied to the eccentric column.

Figure 4:
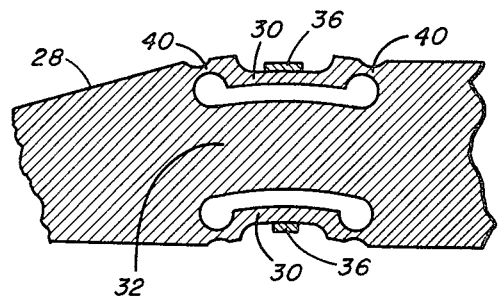
FIG. 4 is a sectional view similar to FIG. 3 showing in exaggerated detail the strain gage balance under load.

In operation the projectile model under test is oriented on the sting which carries the balance of the instant invention as shown in FIG. 1. Air is supplied at a controlled rate through the tube 18 in the sting to the multistage air turbine 20 until a predetermined spin rate is imparted to the test model. The air supply is then terminated and the hypervelocity or subsonic air supply in the wind tunnel is started. The air flowing over the projectile model imparts a number of forces thereto including a side force in the yaw plane generally indicated by the arrow in FIG. 1. Since the eccentric columns of the balance are oriented transverse to these side forces they well flex when under load about the portion of reduced area 40 to the position shown generally in FIG. 4. The necked-down portion 40 of the eccentric columns acts as a pin joint and permits the columns to flex more freely under slight loads. Thus, as the balance is subject to yaw loads, a secondary bending is induced in the eccentric column and this secondary bending acts as a mechanical amplifier for the applied force. Since the eccentric column is relatively thick in comparison with the area of the necked-down portion 40, the column is relatively insensitive to pitch forces or moments and is relatively rigid to oscillations or vibrations in the pitch plane.

It can be readily appreciated that maximum amplification of the applied dynamic loads will occur if the necked-down portion 40 is as thin as possible. The only limitation on the thickness of the necked-down portion would be strength considerations for the dynamic load to be applied.

Although the device of the instant invention has been described as applicable for indicating forces acting in the yaw plane it can be utilized for determining forces acting in any other plane, for example pitch plane, merely by orienting the eccentric columns transverse to the desired force direction.

Obviously many modifications and variations of the present invention are possible in the light of the above teachings. It is therefore to be understood, that within the scope of the appended claims, the invention may be practiced otherwise than as specifically described.

What is claimed is:

1. A strain gage balance comprising an elongate body member having a forward portion and a rearward portion, an intermediate portion integrally formed between said forward and rearward portions, said intermediate portion having an integral center member of substantially reduced cross-sectional area than said forward and rearward portions, at least a pair of columnar members integrally formed between said forward and rearward portions outwardly of said center member, said columnar members having end portions of substantially reduced cross-section to allow said columnar members to flex more freely upon application of a dynamic load and a flattened central portion, and strain gages mounted on each of said flattened central portions.

2. The device of claim 1 including a sting for supporting said elongate body member, and an aerodynamic body completely surrounding said strain gage balance including means for supporting said aerodynamic body on said strain gage balance.

3. The device of claim 2 wherein said means for supporting said aerodynamic body on said strain gage balance is a bearing means to allow said aerodynamic body to rotate with respect to said strain gage balance.

4. The device of claim 3 including means to impart a rotating motion to said aerodynamic body.

References Cited

UNITED STATES PATENTS 3,159,027 12/1964 Curry _____ 73—147

FOREIGN PATENTS 128,179 1960 U.S.S.R.

S. CLEMENT SWISHER, *Acting Primary Examiner.*

NEIL B. SIEGEL, *Assistant Examiner.*